(12) United States Patent
Reeves

(10) Patent No.: US 6,467,690 B1
(45) Date of Patent: Oct. 22, 2002

(54) ELECTRONIC STORAGE MEMORY CARD OR DISK AND LASER READER/WRITER INTERFACE

(75) Inventor: William Reeves, North Branford, CT (US)

(73) Assignee: Med-DataNet, LLC, North Branford, CT (US)

( * ) Notice: Subject to any disclaimer, the term of this patent is extended or adjusted under 35 U.S.C. 154(b) by 0 days.

(21) Appl. No.: 09/288,437

(22) Filed: Apr. 8, 1999

(51) Int. Cl.[7] .................................................. G06K 7/00
(52) U.S. Cl. ....................................... 235/486; 235/475
(58) Field of Search ................................ 235/486, 487, 235/492, 475, 380, 375, 383

(56) References Cited

U.S. PATENT DOCUMENTS

| | | | |
|---|---|---|---|
| 3,976,858 A | * 8/1976 | Haunt | 235/380 |
| 4,692,604 A | 9/1987 | Billings | 235/493 |
| 4,795,898 A | 1/1989 | Bernstein et al. | 235/487 |
| 4,798,322 A | 1/1989 | Bernstein et al. | 235/487 |
| 5,682,295 A | 10/1997 | Horejs, Jr. et al. | 361/737 |
| 5,752,857 A | 5/1998 | Knights | 439/638 |
| 5,872,678 A | * 2/1999 | Boigenzahn et al. | 360/97.01 |

* cited by examiner

Primary Examiner—Thien M. Le

(57) ABSTRACT

An electronic card which is a composite of various materials, including an optically sensitive digital storage section which is capable of being formatted and having digital binary data stored within its surface. The card is capable of being erased and having new data written and of being easily carried on a person in a wallet or purse. An optical screening reader/writer drive is capable of formatting the storage media, writing data onto the card, erasing data from the card and rewriting data onto the same card.

28 Claims, 4 Drawing Sheets

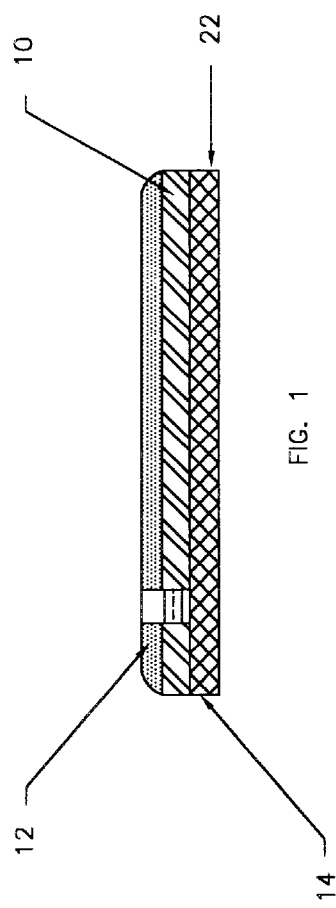
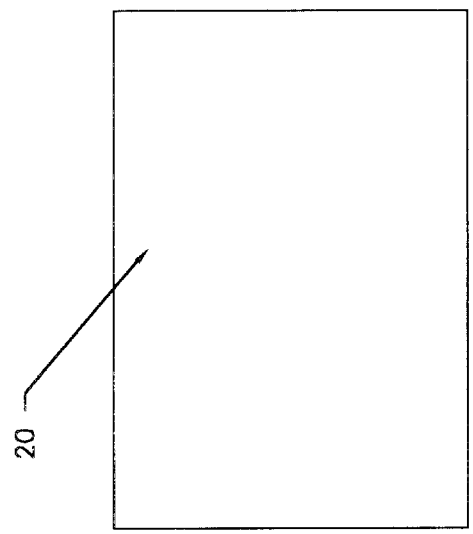
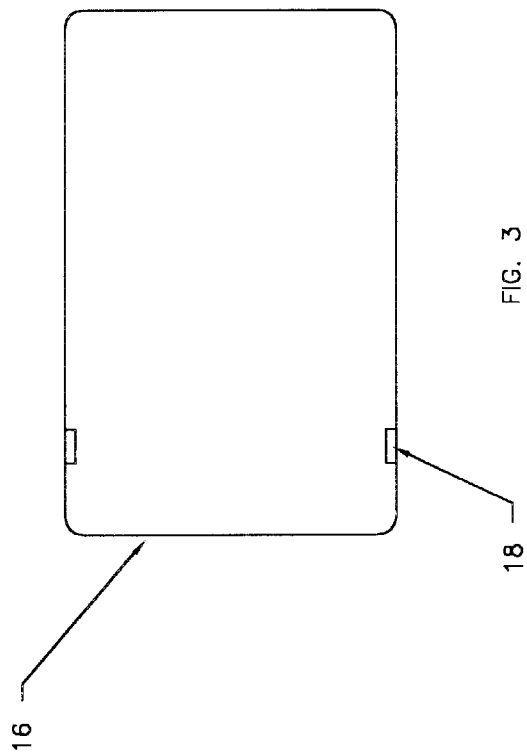

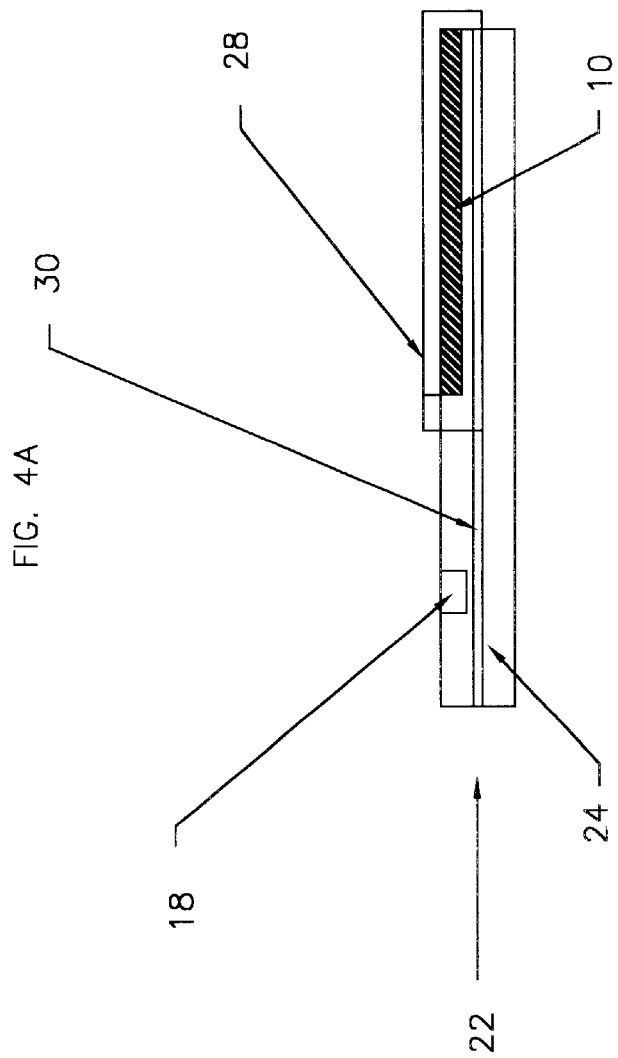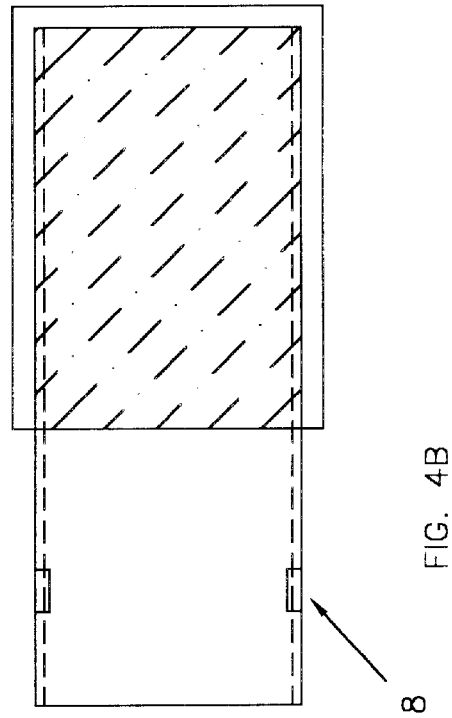

ELECTRONIC STORAGE MEMORY CARD OR DISK AND LASER READER/WRITER INTERFACE

BACKGROUND OF THE INVENTION

1. Field of the Invention

The present invention relates to an electronic storage memory card or disk and a laser reader/writer interface for said card.

2. Description of Related Art

Since the early 1980's, the use of plastic credit card styled computer devices to store data has expanded to encompass a variety of applications, including personal identification, security, banking, telephone cards, debit cards, and storage of personal medical records. These credit card styled devices come in the form of "swipe" type cards and "smart cards". Swipe cards have a magnetic strip or bar code strip mounted on a side of the card and are capable of storing approximately 20–30 k bytes amounts of digital data. The swipe card passively stores the information on the card, which can be read using a optical scanning device or magnetic reader. Applications of the swipe card are limited due to the relatively small amount of digital data which can be stored on the card, and the card's inability to accept new data or updated information from a card reader, as in the case of an interactive debit, or smart, card.

Smart cards are capable of not only data storage and retrieval, but can interact with an interface to add new data or delete stored data. The smart card is primarily designed with a computer chip built into the card which serves as the main storage and retrieval media. The development of the Erasable Programmable Read Only Memory ("EEPROM") chip made this technology feasible about 10 years ago. The use of EEPROM and other computer chip media has allowed the memory storage capacity of the smart card to increase substantially over the swipe card to approximately 32–500 kilobytes of stored information. Most smart cards rely on these relatively large, expensive EEPROM chips to store and retrieve digital data while interacting with a host computer or scanner. A key design feature of smart cards includes the ability of the card to receive electrical power and timing signals from a card reader during the transfer of data between the card and the reader, all without direct, physical contact between the storage media on the card and the reader.

Smart cards built with EEPROM and computer chips are well known in the art. For example, U.S. Pat. Nos. 4,798,322, and 4,795,898 disclose personal memory cards and readers. Electrical circuitry is mounted on the cards to allow the EEPROM to receive electrical power and facilitate the transfer of data to and from the EEPROM without direct ohmic electrical contact.

Similarly, U.S. Pat. No. 5,682,295 discloses a smart card device which is designed from several layers of plastic material and has integrated circuitry sandwiched in between the layers of plastic. A computer memory chip is used as the means of storing and retrieving digital data and electrical power is required to transmit and retrieve data to and from the smart card.

The use of an EEPROM or other computer chip technology on a smart card requires some type of wireless transfer mechanism between the reader and the card in order to transmit electrical power to the card and facilitate the transfer of data. The need for electrical power on the card and the required electrical circuitry can make this type of card not only costly, but bulky and heavy. Furthermore, relatively expensive and specialized readers and writers are required in order to interface with the smart card.

Bearing in mind the problems and deficiencies of the prior art, it is therefore an object of the present invention to provide a smart card which does not require electrical power on the card to retrieve, store or write data to or from the card.

It is another object of the present invention to provide a smart card which does not rely on a computer chip, EEPROM, or other microprocessor component as the data storage medium on the card.

A further object of the invention is to provide a smart card which facilitates binary data storage using laser and optical reading and writing technology.

It is yet another object of the present invention to provide a smart card which does not require any electrical circuitry, contact pads or cladding on the card for digital data transmission to or from the card.

It is yet another object of the present invention to provide a smart card which is extremely thin, lightweight and less subject to mechanical breakage.

It is yet another object of the present invention to provide a smart card with a storage media suitable for dense data tracks and increased storage capacity.

It is yet another object of the present invention to provide a smart card which has a minimum storage capacity of 100–200 megabytes of digital data.

It is yet another object of the present invention to provide a smart card which can be erased and re-used.

It is yet another object of the present invention to provide a optical reader/writer interface for formatting, writing data to, retrieving data from, and erasing and re-writing data onto the smart card of the invention.

Still other objects and advantages of the invention will in part be obvious and will in part be apparent from the specification.

SUMMARY OF THE INVENTION

The above and other objects, which will be apparent to those skilled in the art, are achieved in the present invention which relates, in a first aspect, to an apparatus for storing or retrieving digital data to and from a data storage device carried on a card by an individual. The apparatus comprises: a housing for receiving the card which has accessible on a surface a data storage device containing medical record data; a data transfer head adapted to transfer data between the card and a connector mounted on the housing; a driver adapted for x-y direction movement of the data transfer head with respect to the surface of the data storage device on the card; and a controller adapted to direct movement of the data head with respect to the surface of the data storage device in x and y directions to transfer digital data to or from the card through the connector.

In the preferred embodiment, the data storage device on the card is laser storage media and the data transfer head is a laser data transfer head. It is also preferred that the driver is adapted for z direction movement of the data transfer head with respect to the surface of the data storage device.

The apparatus may also include a fixture in the housing adapted to hold the card in a stationary position during data transfer, and it is preferred that the card have locator notches and the fixture have tabs to engage the locator notches to secure the card in a desired position in the fixture. It is also preferred that the fixture be mounted on a driver adapted for x and y direction movement to facilitate x and y direction movement of the storage media under the data transfer head.

It is preferred that the controller of the apparatus be adapted to direct movement of the data storage device under the data head in x and y directions.

It is also preferred that the card of the apparatus have a data storage device containing digital data accessible on a surface of the card. The card may have an optical data storage media on a surface which contains digital data, or a silicon graphite storage media on a surface which contains digital data. It is most preferred that the card have a laser data storage media on a surface which contains digital data. The laser data storage media may have a clear protective coating over it. In the preferred embodiment, a retractable protective cover protects the laser data storage media.

The apparatus may further include a sensor adapted to detect the insertion of a card into the housing. The sensor communicates with the controller to direct the movement of the data head to the surface of the data storage device to transfer digital data to or from the card.

In a preferred embodiment, the data transfer head and driver are adapted to detect the x-y location of the data transfer head with respect to the surface of the card. The data transfer head and driver may also be adapted to detect the x-y location of the data storage device with respect to the data transfer head.

It is also preferred that the driver be adapted for z direction movement toward and away from the surface of the data storage device on the card and that the data transfer head and driver are adapted to detect the x-y-z location of the data transfer head with respect to the surface of the card.

In a second aspect, the present invention relates to a method of storing or retrieving digital data to and from a data storage device carried on a card by an individual which comprises:

providing a card reading apparatus comprising, a housing for receiving a card having accessible on a portion of a surface thereof a data storage device containing digital data, and a data transfer head adapted to transfer data between said card and a connector mounted on the housing, the data transfer head being mounted on a driver adapted for x-y direction movement over the surface of the data storage device on the card;

moving the data transfer head in x-y directions over the portion of the surface of the card containing the data storage device; and transferring data between the data storage device on the card and the connector.

The method may also include moving the data transfer head in a z direction over the portion of the surface of the card containing the data storage device to transfer said data.

In a preferred embodiment, the method includes moving the portion of the surface of the card containing the data storage device in an x-y direction under the data transfer head.

It is preferred that the data is transferred optically between the data storage device and the card.

The method may also include storing the x-y location of the data transfer head with respect to the card for locating desired data on the data storage device, and it is preferred that the method include moving the data transfer head in a z direction over the portion of the surface of the card containing the data storage device to transfer the data and storing the x-y-z location of the data transfer head with respect to the card for locating desired data on the data storage device.

The method may further include sensing the insertion of the card into the housing, and automatically moving the data head to the surface of the data storage device to transfer digital data to or from the card.

In another embodiment the method includes formatting address tracks on the card with the data transfer head.

In yet a third aspect, the present invention relates to a method of storing or retrieving digital data to and from a data storage device carried on a card by an individual comprising the steps of:

a) providing a card reading apparatus comprising a housing for receiving a card having accessible on a portion of a surface thereof a data storage device containing digital data and a data transfer head adapted to transfer data between the card and a connector mounted on the housing, the data transfer head being mounted on a first driver in the housing adapted for x-y-z direction movement over the surface of the data storage device on the card;

b) providing a sensor in the card reading apparatus adapted to sense when the data storage device is inserted into the card reading apparatus;

c) generating a wake-up signal to a microprocessor unit that the data storage device has been inserted into the card reading apparatus;

d) generating x-y-z location signals to a controller to position the data transfer head over a predetermined position on the data storage device;

e) reading digital data from the data storage device; and f) writing digital data to the data storage device.

It is preferred that the method further comprise the steps, between steps (c) and (d), of:

(i) sending x, y and z direction feedback signals from the data transfer head to a microprocessor adapted to receive and translate the feedback signals; and (ii) repeating step (d) so as to provide more accurate positioning of the data transfer head and data storage device.

It is also preferred that the method further comprise the steps of mounting the data storage device in the housing on a second driver adapted for x and y direction movement to facilitate x and y direction movement of the data storage device under the data transfer head, with the controller controlling the x-y position of the data storage device relative to the data transfer head.

BRIEF DESCRIPTION OF THE DRAWINGS

The features of the invention believed to be novel and the elements characteristic of the invention are set forth with particularity in the appended claims. The figures are for illustration purposes only and are not drawn to scale the invention itself, however, both as to organization and method of operation, may best be understood by reference to the detailed description which follows taken in conjunction with the accompanying drawings in which:

FIG. 1 is an elevational side view of one embodiment of the preferred electronic storage memory card of the present invention.

FIG. 2 is a top plan view of the card of FIG. 1 illustrating the use of printed matter on the card.

FIG. 3 is a top plan view of a plastic storage sleeve for the card of FIG. 1.

FIG. 4a is an elevational side view of another embodiment of the preferred electronic storage memory card of the present invention with a spring loaded retractable shield protecting the storage media.

FIG. 4b is a top plan view of the card of FIG. 4a.

DESCRIPTION OF THE PREFERRED EMBODIMENT(S)

Figure 5:
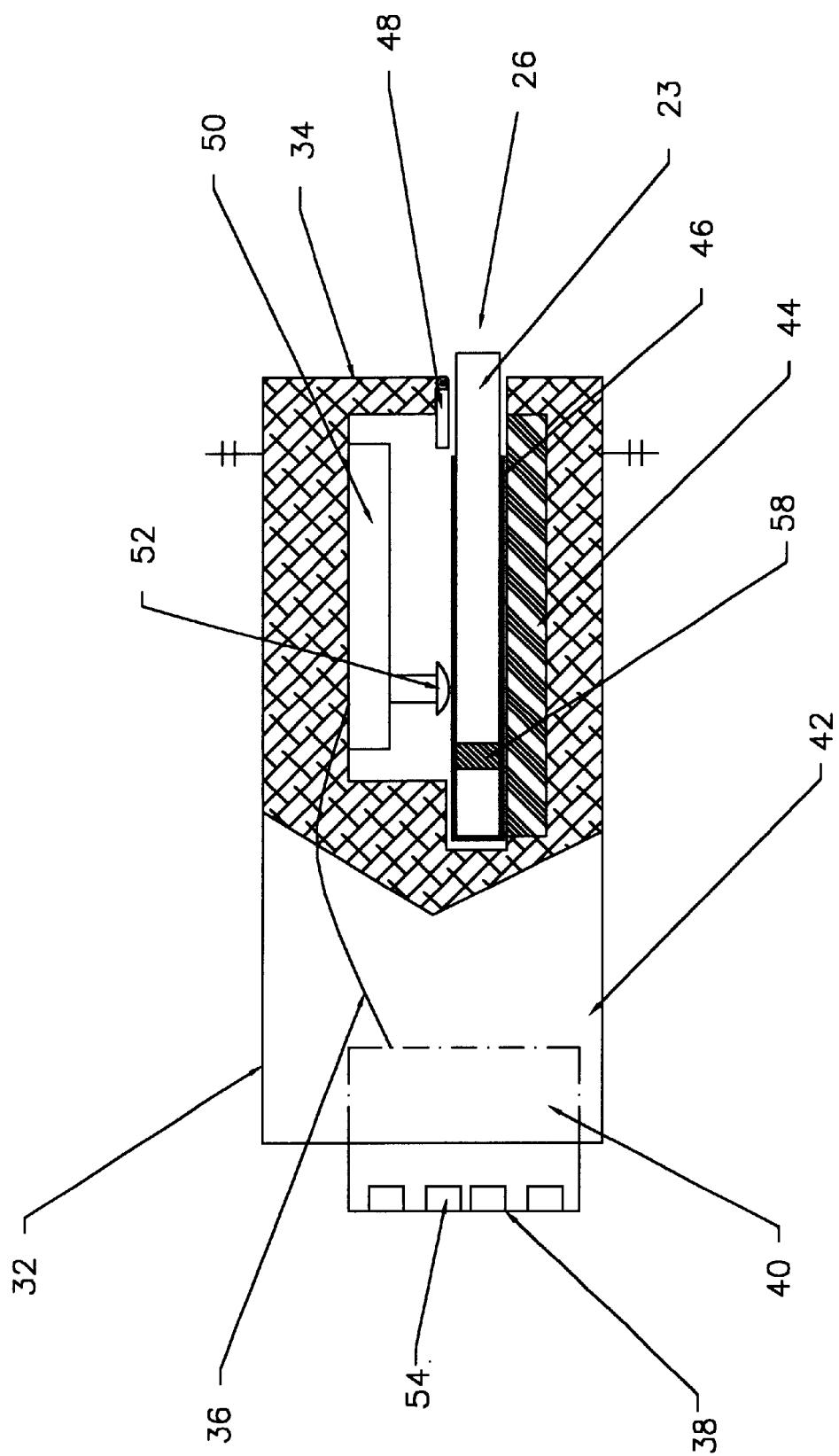
FIG. 5 is a side sectional view of a preferred card reader/writer unit of the present invention.

In describing the preferred embodiment of the present invention, reference will be made herein to FIGS. 1–6 of the drawings in which like numerals refer to like features of the invention. Features of the invention are not necessarily shown to scale in the drawings.

An electronic storage memory card 22 of the present invention is illustrated in FIG. 1. A layer of optically sensitive laser storage media 10 is laminated to the surface of a supporting plastic backing 14. Storage media 10 can be silicon graphite or other suitable optical storage material which is capable of being formatted by laser or other optical device to facilitate digital binary data storage, and is either laminated or molded to the plastic support backing 14. Optically sensitive silicon graphite material, which is commonly used in the computer world for storage of data in compact disks and other storage media, is advantageous in this application because it can store relatively dense amounts of data on "tracks" which can be "formatted" into the surface of the material much the same way as a compact disk. While most EEPROMs and other computer chip media have a storage capacity of only 32–500 kilobytes, the storage media 10 of the present invention will have a minimum storage capacity of 100–200 megabytes of data. Storage media 10 is laminated to one or both sides of the plastic support backing 14 depending upon the application. The thickness of storage media layer 10 should ensure maximum storage capacity without adding excess weight to the card 22. In the preferred embodiment, the storage media 10 should be approximately 0.002–0.005 in. (0.0508–0.127 mm) thick in order for the proper density to be established to store relatively large amounts of digital data on the card while maintaining a very lightweight and mechanically flexible design.

Support backing 14 can be made from any suitable polymer, plastic or composite material which does not interact with the storage media material and has a mechanical strength and spring rate to maintain rigidity, yet flexibility, of card 22. Support backing 14 and card 22 is preferably capable of withstanding excessive bending, torsion or flexing which could damage the storage media 10 laminated to the support backing 14. Support backing 14 is also preferably lightweight and wallet sized on the order of 0.020–0.030 inches thick.

Optionally, a thin, optically clear protective film 12 can be either laminated, molded or thin film sputter deposited over the surface area of the storage media 10. Protective film 12 should be of a very thin nature, such as a polymer film, and be optically clear so as not to interfere with the reading and writing of data to storage media 10. The purpose of protective film 12 is to provide a mechanical protective barrier against scratches and nicks so storage media 10 does not become damaged during normal use and abuse of card 22. As an alternative to protective film 12, the card can be used with a protective plastic or cloth sleeve 20, shown in FIG. 2, to protect it from scratches or nicks. If plastic protective sleeve 20 is used to store and transport the card then the need for protective film 12 can be greatly reduced or eliminated. Plastic sleeve 20 can be imprinted with an alpha-numeric message to indicate the contents of the card 22.

The overall preferred size of card 22 is on the order of about 2.00 in. (50.8 mm) wide by 3.250 in. (82.55 mm) long, making it similar in size and weight to a standard credit card. Card 22 should be easy to carry in a wallet, purse, pocket or other storage device which accepts credit card devices. However, card 22 can be larger or smaller depending on the overall application and size requirements. Either or both sides of card 22 can be embossed or imprinted with an alpha numerical message to indicate the contents of the data stored on the card. For example, as shown in FIG. 3, one side of card 22 may be embossed or imprinted with "Emergency Medical Records—Mr. John Doe,—if lost or stolen please mail to P.O. Box 1 Jonesville, USA", to indicate that the contents of the data card are medical records Mr. Doe. The present invention is particularly useful for individual medical records since an electronic storage memory card 22 may be easily carried upon the person of an individual and contain all of the individual's pertinent medical history as digital data stored in storage media 10. Hospitals, emergency rooms, medical offices, emergency medical technicians (EMTs), ambulance services and the like may have reader/writer units 32 to read quickly any pertinent medical information from an individual needing medical care or assistance, particularly in urgent situations, and may then write the details of the care and medication given to the card for future reference.

Additionally, card 22 can have optional mechanical locator notches 18 to aid in mechanically positioning the card in the reader/writer unit 32 shown in FIG. 5.

The card 22 is unique in that it can be rectangular or square in shape and is non-rotating during operation of the device. Most industry storage devices such as compact disc or 3.5" magnetic disk media must rotate over a reader/writer during operation of the particular device with which each is associated. The card 22 does not need to rotate for proper operation of the device.

The polymer material and optical coatings used in the manufacturing of the card 22 are such that the data transfer head 52 can "imbed", or otherwise alter the storage media 10 of card 22, binary (digital) data, in the form of microscopic ones and zeros, into the storage media 10. The imbedding of digital data is accomplished by using an optically sensitive coating on the storage media 10, which, when the data transfer head is positioned over the storage media 10, digital data is streamed via laser light and imbedded into the surface of the storage media 10 in a uniform and ordered pattern for easy reading and retrieval. In another embodiment of card 22, storage media 10 does not extend over the entire surface of card 22, but is limited to only a portion of the card and is protected by a thin and lightweight retractable shield 28. As shown in FIGS. 4a and 4b, shield 28 can be made from any suitable material including plastic or aluminum. Shield 28 is spring loaded and slotted on its edges, allowing the shield to slide linearly along groove guides 30 on each side of card 22. When card 22 is inserted into the reader/writer unit 32 shown in FIG. 5, shield 28 retracts to expose the storage media 10 to the data transfer head 52. When card 22 is removed from reader/writer unit 32, shield 28 slides back into place over the storage media 10 to protect it from damage.

The preferred reader/writer unit 32 is shown in FIG. 5. Reader/writer unit 32 is unique to card 22 and is an important aspect of the overall invention. The basic components of the reader/writer unit are an enclosure or housing 34, a hinged door 48, a fixture 46 onto which card 22 is secured after insertion into reader/writer unit 32, an x-y-z linear motion driver 50 to which a data transfer head 52 is mounted, a controller 56 and an interface electronics printed circuit board 40. Enclosure 34 of the reader/writer 32 is made from any lightweight, but structurally rigid and sound plastic material. The interior of the enclosure 34 is coated with a protective metallic layer 42 to prevent infra red noise contamination from entering enclosure 34 and interfering with the electronics or transfer of data to or from card 22. The front opening 26 of enclosure 34 has a hinged door 48 for inserting card 22 into reader/writer unit 32 and onto fixture 46. Hinged door 48 is normally closed and is opened by sliding card 22 into front opening 26 onto fixture 46. When card 22 is removed from reader/writer unit 32, door 48 swings back into the closed position by virtue of a mechanical spring mechanism, so no dust or debris can enter the front opening 26.

A data transfer head 52 is mounted on a x-y-z linear motion driver 50 within the enclosure 34. Data transfer head 52 is capable of transmitting and receiving digital data signals to and from the storage media 10. The x-y-z linear motion driver 50 receives signals from a x-y-z linear motion controller 56 and controls the movement of data transfer head 52 relative to storage media 10 in the x, y and z directions. As shown in the figures, the x and y directions are in the plane of the surface of card 22, while the z direction is normal to the plane of the card.

Data transfer head 52 magnetically writes data tracks and data onto storage media 10, reads data from storage media 10 and erases and re-writes data onto storage media 10. The data transfer head 52 uses laser optics to "imbed" digital data into the optically sensitive storage media 10 of card 22, otherwise change or alter the storage media 10 of card 22 to accept binary (digital) data in the form of ones and zeros for the storage of digital data and information. Erasing is accomplished by writing new digital data over existing data or by re-formatting the storage media 10 by writing digital address tracks into storage media 10 on those areas which are blank and void of digitally stored data and then writing new data on these re-formatted address tracks on storage media 10.

Data transfer head 52 is also capable of detecting when a card 22 is inserted into reader/writer unit 32 and transmitting a wake-up signal to the interface electronics printed circuit board 40. Reader/writer unit 32 may also include a separate sensor to detect when a card 22 is inserted into the front opening 26 of enclosure 34.

When card 22 is inserted into reader/writer unit 32 onto fixture 46, card 22 and storage media 10 are stationary with respect to data transfer head 52. Tabs 58 are mounted on the fixture 46 within the enclosure 34 to engage the locator notches 18 on the card 22 and secure card 22 in a fixed and accurate position within the reader/writer unit 32. Unlike existing reader/writers devices used with compact disks having a similar storage medium, the storage medium of the present invention does not need to spin or rotate with respect to data transfer head 52. The data transfer head is capable of movement in the x, y and z directions in order to accurately position itself over storage media 10 at the proper location and height during data transfer. The mechanical locator notches 18 on card 22 aid in fixing the position of the card 22 in reader/writer unit 32.

In an optional version of the present invention, card 22 and storage media 10 may be caused to move in an x-y direction while mounted inside of the reader/writer unit 32. As shown in FIG. 5, card 22 is inserted into reader/writer unit 32, onto fixture 46 which is secured to an x-y linear motion platform driver 44. The purpose of having storage media 10 translate linearly is to increase the relative speed between storage media 10 and data transfer head 52 and increase the data transmission rate to and from the storage media 10. Controller 56 coordinates and controls the relative movement between the storage media 10 and data transfer head 52.

An interface electronics printed circuit board 40 is mounted within casing 34 of the reader/writer unit 32. The electronics and software controls of reader/writer 32 are organized such that feedback signals are sent from data transfer head 52 back through the electronic circuits and cables of reader/writer 32 to a microprocessor 70 mounted on interface electronics board 40. Data transfer head 52 also acts as a mechanical proximity sensor to storage media 10 and sends location signals back to the microprocessor to tell the intelligence of reader/writer 32 where data transfer head 52 is mechanically located in relation to storage media 10 and storage tracks written into media 10. Based on these location signals the microprocessor mathematically calculates x, y and z position coordinates and has the ability to generate and send feedback command signals to controller 56 which tell x-y-z driver 50 what x, y, z motion adjustments to make to properly align and locate data transfer head 52 for optimum performance during reading and writing of digital data onto the storage media 10. Optionally, the controller 56 also tells the x-y driver 44 what x and y direction motion adjustments to make to properly align the card 22 and storage media 10 with the data transfer head 52. Once tracks and addresses have been assigned to a given storage media 10, the microprocessor 70 on interface electronic board 40 has the ability to store and recall such addresses so as to make locating and retrieving data files very quick and efficient.

A ribbon cable 36 or other appropriate wiring connects data transfer head 52 and controller 56 electronics to the interface electronics board 40. Ribbon cable 36 allows data and electrical power to be transmitted between controller 56, data transfer head 52 and interface electronics board 40. The cables and connections of the reader/writer unit 32, including the cables to and from the controller 56, x-y-z linear motion unit 50, x-y linear motion unit 44, and data transfer head 52 are dual use and two way transmission cables, for example, fiber optic cables. These cables are capable of simultaneously sending x, y and z motion signals to and from the data transfer head 52, while sending digital data to and from the data transfer head 52.

Interface electronics board 40 consists of a variety of electronic components and controls for reader/writer unit 32, including a microprocessor 70 for intelligence, linear motion and feedback, a storage chip or device for storing addresses and commands, an A/D-D/A converter for converting analog and digital signals, and an electrical power transformer for stepping high voltage to low voltage in order to provide electrical power to the reader/writer unit and its components.

Reader/writer unit 32 device may also include an optional data transmission board 38 with external electrical contacts or pads 54. Reader/writer unit 32 with data transmission board 38 can function as a stand alone unit to be connected to a computer through a serial or parallel cable, or can be mounted into a computer through one of the computer's auxiliary slots. Data transmission board 38 acts as the interface between reader/writer unit 32 and a computer or other data device and is connected to an external device through electrical pads 54 extending from data transmission board 38. Electrical contact pads 54 on the surface of data transmission board 38 are divided into data input signals, data output signals and electrical power transmission. Data transmission board 38 is connected to interface board 40 by a ribbon cable, direct wiring or any suitable means and a digital signal processing chip controls sending and receiving data from the data transmission board 38 to the reader/writer unit 32.

Reader/writer unit 32 is capable of being fixedly mounted in a computer or used as a peripheral to any number of data devices. An alternative to data transmission board 38 is a wiring harness, ribbon cable connection, parallel or serial interface or any suitable means of two way data transmission between reader/writer unit 32 and a data device. The interface with a computer, optical scanning device or other digital data transmission device allows reader/writer unit 32 to accept data and command signals from a data device, write those files to a card 22, read and transmit files from card 22, and erase and re-write new files to the card.

An integral part of the present invention is the unique software and microprocessor intelligence 70 which is used to control the flow of data into and out of reader/writer device 32. The microprocessor intelligence 70 has the ability to send storage format commands 72 and storage address commands 74 to data transfer head 52 to format storage media 10 and write address tracks onto the storage media 10 for files and data storage. The term "formatting" and "addressing" a card 22 refers to the data transfer head 52 optically marking the card 22 with a grid of address tracks onto which data can subsequently be written. This process is very similar to the way standard 3.5" computer disks are formatted. For example, a predetermined format command pattern may instruct data transfer head 52 to optically mark 1000 address tracks onto card 22, with each of the 1000 tracks being 0.001 inches in width and 3 inches long. Each of the 1000 tracks would be assigned an x, y, z address so that writing and retrieval of the data is performed in a rapid and efficient manner.

The data transfer head 52 also has the capability to send file address feedback signals 84 to microprocessor 70 so that microprocessor 70 can create a precise address history for given files to facilitate the rapid location and retrieval of the files during operation. Microprocessor 70 also has the ability to send and receive external data input/output signals 68 from data transmission contact board 38 to allow reader/writer unit 32 to interface with a computer, optical scanner, CD drive or other digital data storage and transmittal device. The microprocessor 70 can send data read/write signals 86 to data transfer head 52 directing the data transfer head to read a file already imbedded onto storage media 10 or to write a file to storage media 10 which is being transmitted through the interface electronics board 40. Microprocessor 70 can also send data retrieval signals to the x-y-z linear motion unit 50, and locate and retrieve a given file already imbedded onto a storage media 10. The microprocessor 70 also has the ability to send data erase and re-write signals to the x-y-z linear motion unit 50 and data transfer head 52 so as to command the data transfer head 52 to erase a given file and/or re-write a new file onto the old erased address. Thus storage media 10 can be erased and the cards 22 reused.

Figure 6:
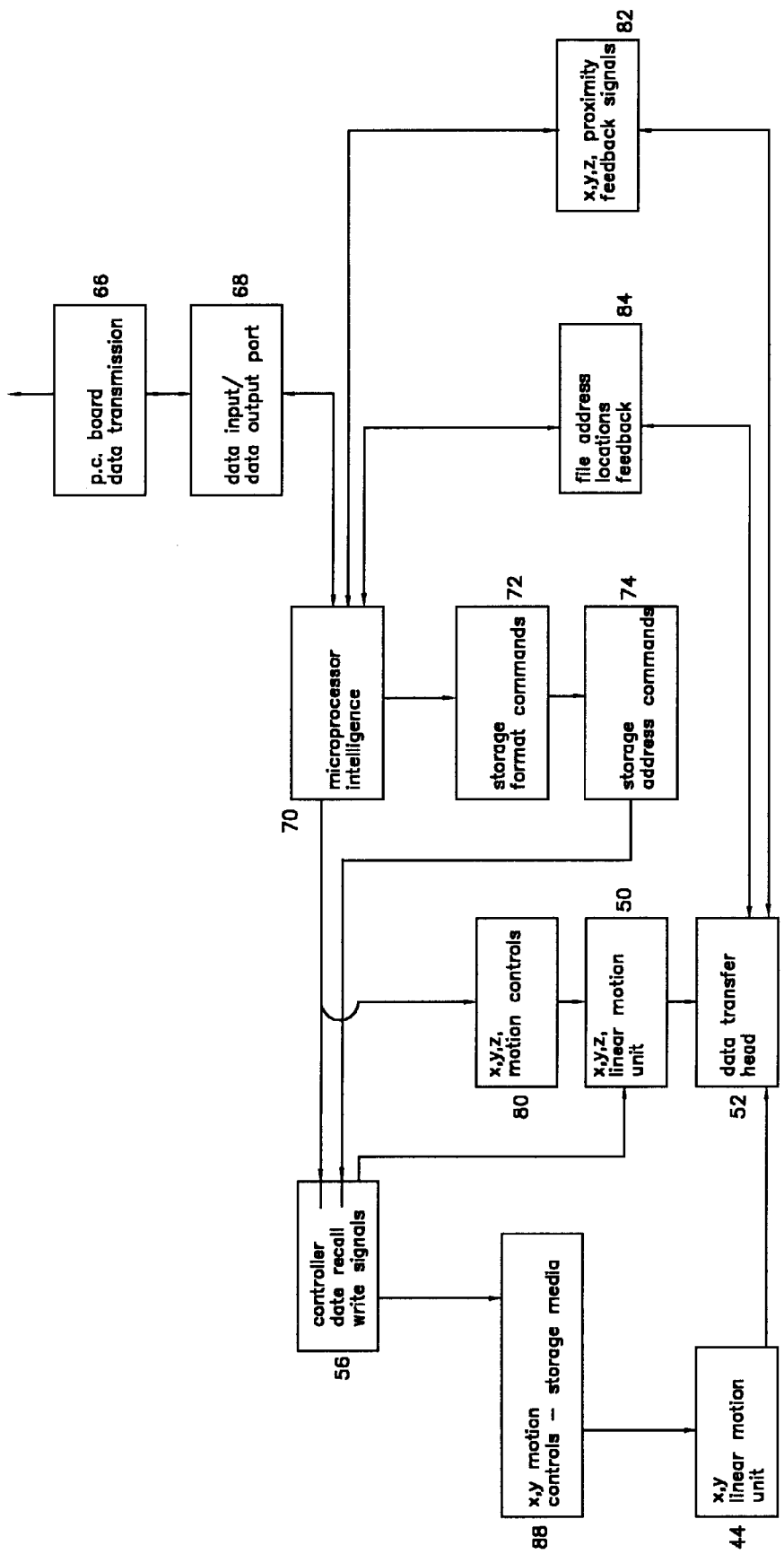
FIG. 6 is a block diagram flowchart of the software control process of the present invention.

As shown in FIG. 6, microprocessor 70 contains the software and controls. The software is either embedded into the microprocessor 70 on the interface electronics board 40, or stored in a RAM memory chip or other appropriate digital storage media chip mounted on the interface electronics board 40. The software and microprocessor 70 sends command signals to each of the components of the reader/writer device 32 in order to coordinate its operation. These operations includes controlling the flow of data from the reader/writer device 32 onto the card 22, formatting the card 22 (the formatted card is designated as card 23) and writing data tracks and addresses onto the card 22, creating addresses and locations of files on storage media tracks, writing data onto the card 22, reading the data from the card 22, and erasing and re-writing data onto the card. The microprocessor 70 may receive the x, y, z proximity feedback signals sent by the data transfer head 52 and used to control the movement and properly align the data transfer head 52. The microprocessor 70 may also control the x-y movement of the card 22 while mounted inside of the reader/writer unit 32.

In order to format a blank storage card 22, the device operator inserts a card 22 into the reader/writer unit 32. The data transfer head 52 senses that a card 22 is inserted into reader/writer unit 32 and generates a wake-up signal to the microprocessor 70. The wake-up signal may be generated in response to the data transfer head 52 sensing the reflection of light off of the card 22. The data transfer head senses the proximity of the card 22 and sends x, y, z proximity feedback signals 82 to the microprocessor 70. The microprocessor 70 acknowledges the receipt of the x, y, z proximity feedback signals 82 and initiates storage format commands 72 and storage address commands 74. The storage format commands 72 and storage address commands 74 contain x, y and z motion control signals which are sent to a controller 56. The controller 56 translates the storage format commands 72 and storage address commands 74 into motion control signals 80 and directs x-y-z linear driver 50, and optionally the x-y driver 44, to move data transfer head 52 and card 22 to the given coordinates so that data transfer head 52 is accurately positioned over a point on the storage media 10. The x-y-z linear driver 50 is comprised of x, y, and z servo motor-lead screw assemblies which act to move the data transfer head into position for formatting and addressing a card 22.

The relative motion between the data transfer head 52 and card 22 and storage media 10 is coordinated by the motion commands generated by microprocessor intelligence 70 and controller 56, and x, y, z proximity feedback signals 82 received by microprocessor intelligence 70. The data transfer head 52 sends x, y, z proximity feedback signals 82 to the microprocessor intelligence 70 which allows the microprocessor intelligence 70 to make precise x, y and z location adjustments of data transfer head 52 with respect to storage media 10 during the course of reading and writing digital data to and from the storage media. The data transfer head 52 has the ability to optically sense its x, y and z location in relation to the card 22 by virtue of light pulse signals sent to and reflected from the surface of the card 22. This mechanical adjustment and feedback process is continuous during the formatting and reading/writing of data onto the card 22.

Once the card 22 has gone through the formatting process, digital data is written onto the address tracks of the formatted card 23. The operator inserts a formatted card 23 into the reader/writer unit 32 and the unit 32 detects the presence of the card 23 in the same manner as described for card 22. The data transfer head 52 senses the presence of the card 23 and generates x,y,z proximity feedback signals 82 to the microprocessor intelligence 70. The data transfer head 52 detects that the card 23 is formatted and ready to accept data. The microprocessor intelligence 70 also sends a signal to the data transfer head 32 to detect if the card 23 is formatted and generates motion control signals to the controller 56. The controller 56 rearranges and interprets the motion control signals and generates x, y and z motion control signals to move the data transfer head 52 to a predetermined position corresponding to the address location 0,0,0 of the card 23. The x-y-z driver 50 receives the motion control signals and moves the data transfer head 52 into the predetermined position over the card 23.

Once the data transfer head 52 is at address location 0,0,0, of card 23, the microprocessor intelligence 70 sends data write signals to the controller 56. The digital files to be written onto the tracks of card 23 can be stored in a limited storage RAM section of the microprocessor intelligence 70, or sent directly to and from the microprocessor intelligence 70 via the data input/output communications port 68 and data transmission PC board 66. Both the data input/output communications port 68 and data transmission PC board 66 may interface with a wide variety of data storage and retrieval devices including, for example, personal computers, computer work stations, cellular telephones, digital cameras, digital video printers and digital music recording equipment.

The particular protocol for reading and writing digital data onto and from card 23 is preferably contained in software code embedded in microprocessor intelligence 70. The reading and writing of digital data onto card 23 takes into account the speed and density of digital data which can be written onto the tracks of storage media 10 on card 23 during a given time period. By moving the data transfer head 52 at a given x, y linear speed, the digital data is written onto the storage media address tracks of card 23 at a given rate and density per track inch (or per track surface area). The proximity feedback sensing of the data transfer head 52 is an important part of determining the linear x, y speed at which the data transfer head 52 is traveling during the reading and writing of digital data to and from the card 23. Changes in speed and position of the data transfer head 52 is achieved via the x, y and z proximity signals.

Once a given storage track is filled with digital data, the data transfer head 52 will indent to the next storage track and start at its 0,0,0 origin to begin writing additional data onto the tracks. This pattern is repeated until the card 23 is full and cannot accept more data.

During the reading and writing of data onto the card 23, the microprocessor intelligence 70 assigns storage track addresses to each individual file stored on card 23 via address storage commands 74. The address storage commands 74 instruct the data transfer head 52 to write a digital address marker onto the tracks at the beginning of a specific file so this file and its digital information can be rapidly retrieved during a reading operation.

In response to a request to retrieve and read data from a specific file, the microprocessor intelligence 70 sends a file retrieve command to the controller 56. The controller 56 interprets these commands into x, y, z motion commands for the x-y-z linear motion unit 50. The x-y-z linear motion unit 50 sends the commands to the data transfer head 52 which searching for the given file's digital address marker. Once the data transfer head locates the file, it reads the tracks of digital data and sends the data back through the microprocessor intelligence 70 to the data input/output port 68 to be distributed to the source of the request for data retrieval.

To speed up the process of reading and writing data onto and from the cards 23, the reader/writer unit 32 may, in addition to moving the data transfer head 52 in x, y and z directions, move the card 23 in x and y directions simultaneously. The microprocessor intelligence 70 sends x, y motion control signals 88 to the x-y linear motion unit 44 via the controller 56. The simultaneous movement of the card 23 in x and y directions greatly increases the relative velocity of movement between the data transfer head 52 and the card 23 during either data writing or data retrieval. The x-y linear motion unit 44 translates the card 23 in an x-y direction in a synchronized manner with the data transfer head 52 so that the relative velocity of the data transfer head 52 to the card 23 is increased and file addresses are quickly located for retrieval.

In order to erase data files from the card 23 and re-write and reuse the card 23, the card 23 is inserted into the reader/writer unit 32. Once the card 23 is inserted, the data transfer head senses the presence of the card 23 in the same manner as previously described for card 22. In response to a file erase command from an external source or the data transmission PC board 66, the microprocessor intelligence 70 generates a command to erase a given file which is then processed through the controller 56. The data transfer head 52 most easily erases a given file or an entire card 23 by re-formatting the given file tracks or the entire card. Once re-formatted, the track or card 23 is ready to accept a new data file.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for storing or retrieving digital data to and from a data storage device carried on a card by an individual comprising:
   a housing for receiving a card having accessible on a surface thereof a data storage device containing medical record data;
   a data transfer head adapted to transfer data between said card and a connector mounted on said housing;
   a driver adapted for x-y direction movement of said data transfer head with respect to the surface of the data storage device on said card; and
   a controller adapted to direct movement of said data head with respect to the surface of the data storage device in x and y directions to transfer digital data to or from said card through said connector.

2. The apparatus of claim 1 wherein the data storage device on said card comprises laser storage media, and said data transfer head comprises a laser data transfer head.

3. The apparatus of claim 1 wherein said driver is further adapted for z direction movement of said data transfer head with respect to the surface of the data storage device on said card.

4. The apparatus of claim 1 further including a fixture in said housing adapted to hold said card in a stationary position during data transfer.

5. The apparatus of claim 1 including a fixture in said housing adapted to hold said card in a stationary position during data transfer, and wherein said card includes locator notches therein and further including tabs adapted to engage the locator notches to secure said card in a desired position in said fixture.

6. The apparatus of claim 1 further including a fixture in said housing adapted to hold said card in a stationary position, said fixture being mounted on said driver adapted for x and y direction movement to facilitate x and y direction movement of the storage media under the data transfer head.

7. The apparatus of claim 6 wherein said controller is adapted to direct movement of said data storage device under the data head in x and y directions.

8. The apparatus of claim 1 further including a card having accessible on a surface thereof a data storage device containing digital data.

9. The apparatus of claim 1 further including a card having on a surface thereof optical data storage media containing digital data.

10. The apparatus of claim 1 further including a card having on a surface thereof silicon graphite data storage media containing digital data.

11. The apparatus of claim 1 further including a card having accessible on a surface thereof laser data storage media containing digital data, said card including locator notches therein for engagement with tabs in said housing to secure said card in a desired position therein.

12. The apparatus of claim 1 further including a card having on a surface thereof laser data storage media containing digital data and a clear protective coating over said laser data storage media.

13. The apparatus of claim 1 further including a card having on a surface thereof laser data storage media containing digital data and a retractable protective cover over said laser data storage media.

14. The apparatus of claim 1 further including a sensor adapted to detect insertion of said card into said housing, said sensor in communication with said controller to direct movement of said data head to the surface of the data storage device to transfer digital data to or from said card.

15. The apparatus of claim 1 wherein said data transfer head and driver are adapted to detect x-y location of said data transfer head with respect to the surface of said card.

16. The apparatus of claim 1 wherein said data transfer head and driver are adapted to detect x-y location of the data storage device with respect to the data transfer head.

17. The apparatus of claim 1 wherein said driver is further adapted for z direction movement toward and away from the surface of the data storage device on said card and wherein said data transfer head and driver are adapted to detect x-y-z location of said data transfer head with respect to the surface of said card.

18. A method of storing or retrieving digital data to and from a data storage device carried on a card by an individual comprising:
   providing a card reading apparatus comprising a housing for receiving a card having accessible on a portion of a surface thereof a data storage device containing digital data and a data transfer head adapted to transfer data between said card and a connector mounted on said housing, said data transfer head being mounted on a driver adapted for x-y direction movement over the surface of the data storage device on said card;
   moving said data transfer head in x-y directions over the portion of the surface of the card containing the data storage device; and
   transferring data between the data storage device on said card and said connector.

19. The method of claim 18 further including moving said data transfer head in a z direction over the portion of the surface of the card containing the data storage device to transfer said data.

20. The method of claim 18 further including moving the portion of the surface of said card containing the data storage device in an x-y direction under the data transfer head.

21. The method of claim 18 wherein said data is transferred optically between the data storage device and said card.

22. The method of claim 18 further including storing x-y location of said data transfer head with respect to said card for locating desired data on the data storage device.

23. The method of claim 18 further including sensing insertion of said card into said housing, and automatically moving said data head to the surface of the data storage device to transfer digital data to or from said card in response.

24. The method of claim 18 further including moving said data transfer head in a Z direction over the portion of the surface of the card containing the data storage device to transfer said data and storing x-y-z location of said data transfer head with respect to said card for locating desired data on the data storage device.

25. The method of claim 18 further including formatting address tracks on said card with said data transfer head.

26. A method of storing or retrieving digital data to and from a data storage device carried on a card by an individual comprising the steps of:
   a) providing a card reading apparatus comprising a housing for receiving a card having accessible on a portion of a surface thereof a data storage device containing digital data and a data transfer head adapted to transfer data between said card and a connector mounted on said housing, said data transfer head being mounted on a first driver in said housing adapted for x-y-z direction movement over the surface of the data storage device on said card;
   b) providing a sensor in said card reading apparatus adapted to sense when said data storage device is inserted into said card reading apparatus;
   c) generating a wake-up signal to a microprocessor unit that said data storage device has been inserted into said card reading apparatus;
   d) generating x-y-z location signals to a controller to position said data transfer head over a predetermined position on said data storage device;
   e) reading digital data from said data storage device; and
   f) writing digital data to said data storage device.

27. The method of claim 26, further comprising the steps, between steps (c) and (d), of:
   (i) sending x, y and z direction feedback signals from the data transfer head to the microprocessor, said microprocessor adapted to receive and translate said feedback signals; and
   (ii) repeating step (d) so as to provide more accurate positioning of the data transfer head and data storage device.

28. The method of claim 26, further comprising the steps of mounting said data storage device in said housing on a second driver adapted for x and y direction movement to facilitate x and y direction movement of the data storage device under said data transfer head, said controller controlling the x-y position of said data storage device relative to said data transfer head.

* * * * *